United States Patent
Lumpkin et al.

(10) Patent No.: US 11,220,279 B2
(45) Date of Patent: Jan. 11, 2022

(54) INSERT AND WEAR RING FOR A RAILWAY ROLLER BEARING

(71) Applicant: Amsted Rail Company, Inc., Chicago, IL (US)

(72) Inventors: Michael Lumpkin, Richmond, VA (US); Michael Mason, Richmond, VA (US)

(73) Assignee: Amsted Rail Company, Inc., Chicago, IL (US)

( * ) Notice: Subject to any disclaimer, the term of this patent is extended or adjusted under 35 U.S.C. 154(b) by 692 days.

(21) Appl. No.: 16/031,556

(22) Filed: Jul. 10, 2018

(65) Prior Publication Data

US 2020/0017129 A1    Jan. 16, 2020

(51) Int. Cl.
*F16C 33/78* (2006.01)
*B61F 15/20* (2006.01)
*B61F 15/12* (2006.01)
*B61F 15/22* (2006.01)

(52) U.S. Cl.
CPC ............. *B61F 15/20* (2013.01); *B61F 15/12* (2013.01); *B61F 15/22* (2013.01); *F16C 33/7813* (2013.01); *F16C 2226/74* (2013.01); *F16C 2326/10* (2013.01); *F16C 2361/31* (2013.01)

(58) Field of Classification Search
CPC .......... B61F 15/12; B61F 15/20; B61F 15/22; F16C 19/386; F16C 33/7813; F16C 33/7826; F16C 2226/74; F16C 2326/10; F16C 2361/31
See application file for complete search history.

(56) References Cited

U.S. PATENT DOCUMENTS

| 3,494,682 | A |   | 2/1970  | Keller   |            |
|-----------|---|---|---------|----------|------------|
| 5,017,025 | A |   | 5/1991  | Williams |            |
| 5,549,395 | A |   | 8/1996  | Sink     |            |
| 6,126,321 | A | * | 10/2000 | Fetty    | F16C 19/386 |
|           |   |   |         |          | 384/459    |
| 6,334,713 | B1|   | 1/2002  | Chu      |            |
| 6,561,559 | B1|   | 5/2003  | Skiller  |            |
| 7,534,047 | B2|   | 5/2009  | Reed     |            |

(Continued)

FOREIGN PATENT DOCUMENTS

| EP | 2829571 A1     |   | 1/2015 |              |
|----|----------------|---|--------|--------------|
| WO | WO-0238428 A1  | * | 5/2002 | F16C 33/7813 |
| WO | 2006094031 A1  |   | 9/2006 |              |

OTHER PUBLICATIONS

PCT Search Report and Written Opinion from International Application No. PCT/US2019/036896, dated Sep. 3, 2019; 15 pages.

(Continued)

*Primary Examiner* — Phillip A Johnson
(74) *Attorney, Agent, or Firm* — Fitch, Even, Tabin & Flannery LLP (57) ABSTRACT

In accordance with one aspect of the present disclosure, a wear ring assembly is provided for a railway roller bearing. The wear ring assembly includes a wear ring having a central opening for receiving a journal of a railway wheel assembly and an insert including a plurality of spacers configured to extend in the opening of the wear ring to separate the wear ring from the journal. The spacers are spaced apart from each other about the wear ring. The insert may include one or more flanges that separate the wear ring from a bearing cone.

42 Claims, 10 Drawing Sheets

(56) References Cited

U.S. PATENT DOCUMENTS

| | | |
|---|---|---|
| 7,607,836 B2 | 10/2009 | Mason |
| 7,955,001 B2 | 6/2011 | Reed |
| 8,109,674 B2 | 2/2012 | Hubbard |
| 8,226,299 B2 | 7/2012 | Hubbard |
| 8,356,941 B2 | 1/2013 | Mason |
| 8,356,945 B2 | 1/2013 | Mason |
| 8,360,651 B1 | 1/2013 | Fetty |
| 8,533,957 B2 | 9/2013 | Spurlock |
| 8,596,872 B2 | 12/2013 | Pruden |
| 8,696,212 B2 | 4/2014 | Hubbard |
| 9,789,887 B2 | 10/2017 | Johansson |
| 10,330,156 B2 | 6/2019 | Hubbard |
| 10,371,210 B2 | 8/2019 | Hargraves |
| 10,711,842 B2 | 7/2020 | Liebe |
| 10,746,228 B2 | 8/2020 | Hargraves |
| 2008/0085069 A1 | 4/2008 | Toth |
| 2009/0123099 A1 | 5/2009 | Dickerhoff |
| 2010/0272381 A1* | 10/2010 | Hubbard ............... F16C 33/80 384/480 |
| 2010/0322544 A1 | 12/2010 | Hubbard |
| 2011/0123142 A1* | 5/2011 | Mason ............... B61F 15/12 384/571 |
| 2012/0027330 A1 | 2/2012 | Fetty |
| 2012/0195540 A1 | 8/2012 | Hubbard |
| 2015/0050506 A1 | 2/2015 | Musha |
| 2020/0078843 A1 | 3/2020 | Ford |
| 2020/0340719 A1 | 10/2020 | Hargraves |
| 2021/0040991 A1 | 2/2021 | Fetty |
| 2021/0048071 A1 | 2/2021 | Hargraves |

OTHER PUBLICATIONS

Swedish Office Action from related Swedish Patent Application No. 2150113-5, dated Sep. 7, 2021; 10 pages.

\* cited by examiner

INSERT AND WEAR RING FOR A RAILWAY ROLLER BEARING

FIELD

This disclosure relates to roller bearings used in railway applications and, more specifically, to wear rings of roller bearings that receive journals of railway wheel assemblies.

BACKGROUND

Railcars have undercarriage truck assemblies that each include a frame, one or more wheel assemblies, and roller bearings that connect the wheel assemblies to the frame. Each wheel assembly includes an axle with wheels and journals at opposite ends of the axle. Each roller bearing includes a first component mounted to the journal that turns with the journal and a second component that is mounted to the frame.

Various types of roller bearings are used for railcars. One type of roller bearing is a tapered roller bearing that includes two rows of tapered rollers that travel along races defined by a bearing cup and bearing cones of the roller bearing. The roller bearing includes wear rings that separate the bearing cones from an end cap at an outboard end of a journal and a backing ring at an inboard end of the journal. The wear rings, cones, and backing ring are typically made of steel as is the journal. Fretting wear occurs between the wear ring and the journal due to high static and dynamic loading which results in flexing of the axle and relative movement between the journal of the axle and the wear rings fitted on the journal. Fretting wear may cause the wear ring to form grooves in the journal. If the groove is deeper than a set limit, such as 0.01 inches, the journal cannot be remanufactured and the axle must be scrapped according to regulations promulgated by the Association of American Railroads. Fretting wear may also occur between a side of the wear ring and an abutting side of a bearing cone. The wear ring creates a groove in the bearing cone which may decrease the stacked length of the bearing cone and wear ring along the journal and reduce the clamping force provided by an end cap on the journal. This, in turn, can lead to more journal fretting because the bearing cone and wear ring are less firmly held together.

One approach to reducing fretting wear between the wear ring and the journal is to position an annular spacer made of polyvinylchloride (PVC) between an outer surface of the journal and an inner surface of the wear ring. This approach is disclosed in U.S. Pat. No. 5,549,395 to Sink. The '395 patent discloses a spacer ring that is inserted into a wear ring by a pressing operation. The spacer ring is telescoped along the inner surface of the wear ring until the spacer ring snaps into a groove of the wear ring. In a prior commercial application of the disclosures of the '395 patent, a spacer ring was bent into a jellybean shape and fit into the wear ring by positioning one side of the spacer ring into the wear ring, and then bending the remainder of the spacer ring into the wear ring. However, the spacer ring is formed from a dense PVC material and often breaks as the spacer ring is fit into the wear ring. Further, the spacer ring is difficult to handle and position accurately within the wear ring.

SUMMARY

In accordance with one aspect of the present disclosure, an insert for a wear ring of a railway roller bearing is provided that includes an annular body of a polymer material. The polymer material of the annular body accommodates minute relative movement between the wear ring and a journal as the journal rotates and limits fretting wear between the journal and wear ring. The annular body includes fingers spaced apart from each other about the annular body. The annular body permits at least one of the fingers to be deflected radially inward as the fingers are inserted into a wear ring. In this manner, the fingers may be readily advanced into the wear ring to inhibit fretting wear between the wear ring and the journal.

In one form, the fingers of the insert include protrusions configured to engage a groove of the wear ring. The protrusions form a snap-fit connection between the insert and the wear ring. The insert may thereby be quickly and easily connected to the wear ring by advancing the fingers of the insert into the opening of the wear ring and engaging the finger protrusions with the groove of the wear ring.

In accordance with another aspect of the present disclosure, a wear ring assembly is provided for a railway roller bearing. The wear ring assembly includes a wear ring having a central opening for receiving a journal of a railway wheel assembly. The wear ring assembly further comprises an insert including a plurality of spacers configured to extend in the opening of the wear ring to separate the wear ring from the journal. The spacers are separated from each other around the wear ring. Because the spacers are discontinuous around the wear ring, the spacers may be more easily advanced into the opening of the wear ring than a continuous ring of dense PVC material as disclosed in U.S. Pat. No. 5,549,395 to Sink.

In one form, the wear ring has opposite sides that face a bearing cone and a backing ring. The insert includes at least one flange extending along one side of the wear ring to separate the wear ring from the bearing cone. The insert thereby inhibits fretting wear between the wear ring and both the journal and the bearing cone.

The present disclosure also provides a method of assembling a wear ring and an insert having a plurality of spacers. The method includes advancing at least one of the plurality of spacers into an opening of the wear ring. The method further includes advancing the reminder of the spacers into the opening of the wear ring to position the spacers around the opening of the wear ring. By sequentially advancing the spacers into the opening of the wear ring, not all of the spacers need to be advanced into the wear ring opening at once which makes it easier to advance the spacers into the wear ring opening. This provides easier assembly of the wear ring and the insert.

In one form, the insert has a unitary, one-piece construction and is made of a resilient polymer material. Once the at least one of the spacers have been advanced into the wear ring opening, one or more portions of the insert are deflected to permit the remainder of the plurality of spacers to be advanced into the opening of the wear ring.

DETAILED DESCRIPTION

Figure 1:
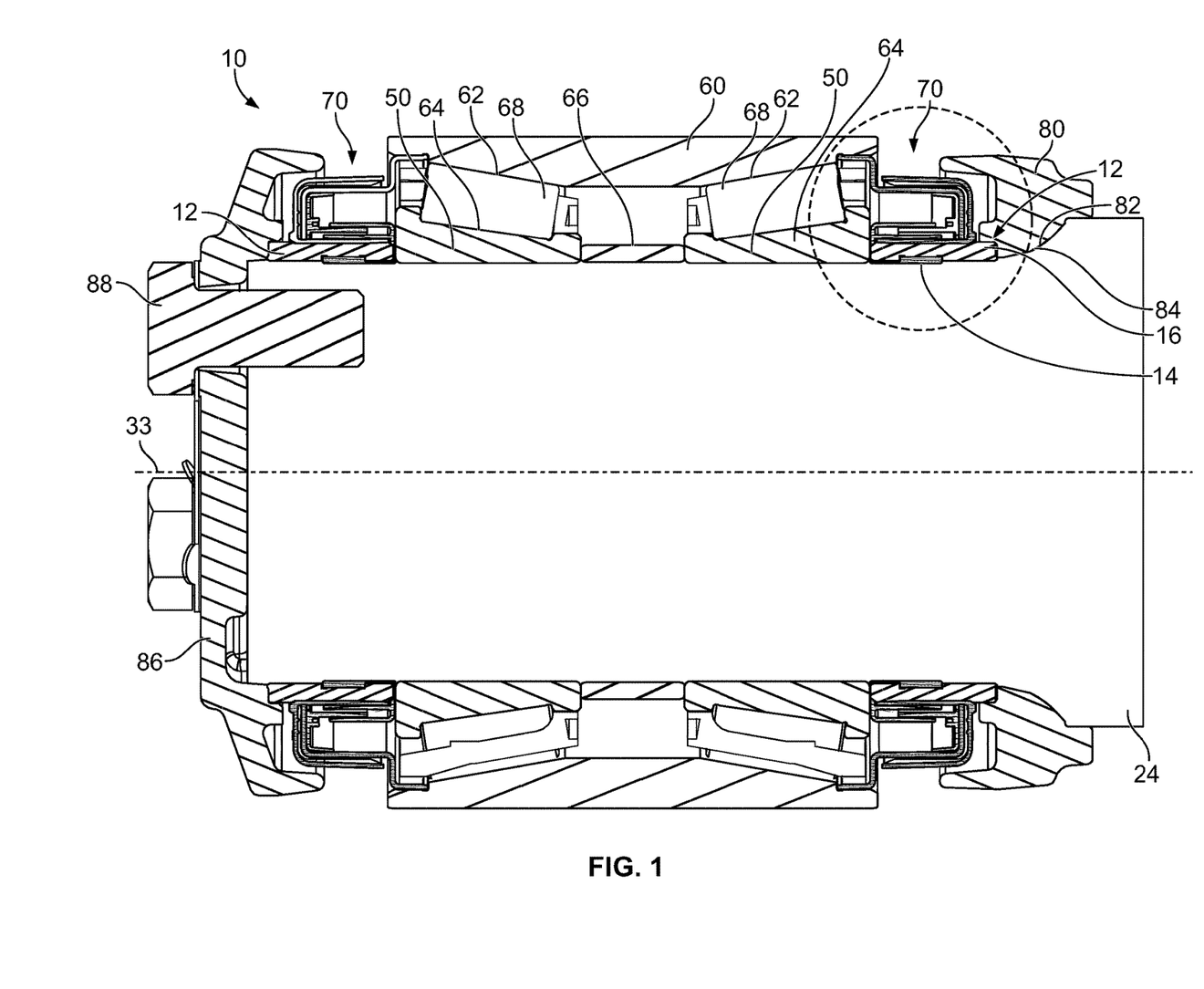
FIG. 1 is a cross-sectional view of a roller bearing and a journal of a railway wheel assembly, the roller bearing including a pair of roller bearing cone assemblies and associated wear rings at opposite ends of a bearing cup of the roller bearing.
Figure 2:
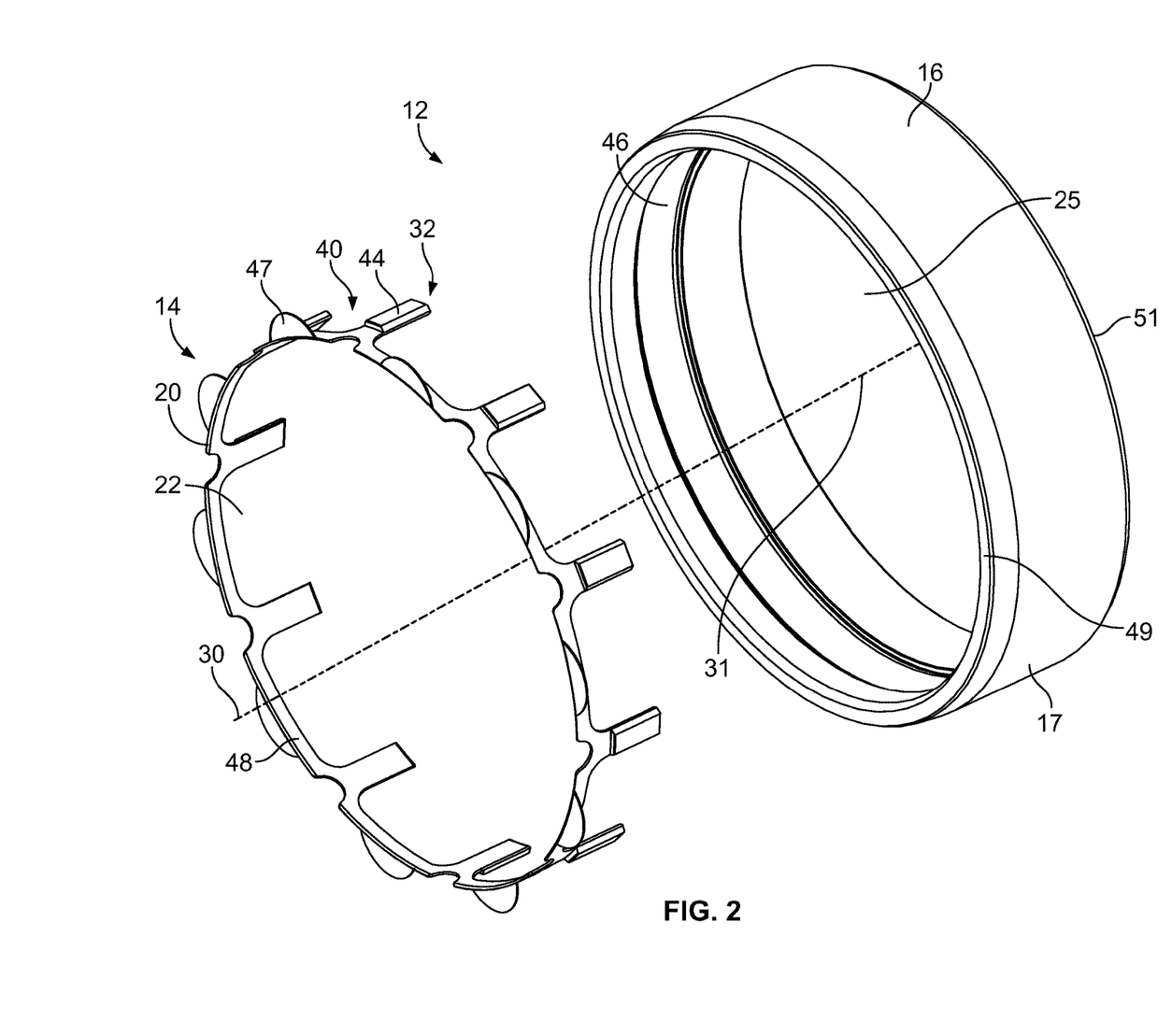
FIG. 2 is an exploded view of one of the wear rings and an associated insert of the roller bearing of FIG. 1 showing fingers of the insert.

With reference to FIGS. 1 and 2, a roller bearing 10 is provided that includes wear ring assemblies 12. With reference to FIG. 2, each wear ring assembly 12 includes an insert 14 and a wear ring 16. The insert 14 may be made of a polymer material, such as a plastic such as polybutylene terephthalate (PBT), and the wear ring 16 may be made of metallic material, such as steel. The insert 14 includes an annular body 20 that extends about a central opening 22 sized to receive a journal 24 of an axle of a railway wheel assembly. The wear ring 16 includes a wall 17 extending between sides 49, 51 of the wear ring 16. The wall 17 extends about a central opening 25 of the wear ring 16 sized to receive the insert 14 and the journal 24 therein. To assemble the insert 14 and the wear ring 16, the insert 14 is partially advanced into the opening 25 of the wear ring 16 (see FIG. 6) and is then axially pressed and snapped into place within the wear ring 16 (see FIGS. 7 and 8). The insert 14 is flexible to permit the insert 14 to be advanced into the opening 25 with minimal force which permits easier assembly of the insert 14 and wear ring 16. The assembled insert 14 and wear ring 16 are assembled with the other components of the roller bearing 10 and the roller bearing 10 is press-fit onto the journal 24. The insert 14 of each of the wear rings 16 of the roller bearing 10 inhibits fretting wear between the wear rings 16 and the journal 24.

The insert 14 includes a plurality of spacers, such as fingers 32, that are separated from each other about the body 20 as shown in FIG. 2. The fingers 32 form a discontinuous, fretting wear dampening structure around the journal 24 that separates the wear ring 16 from the journal 24. The body 20 is deflectable to permit the fingers 32 to be inserted into the wear ring 16. In one embodiment, the body 20 includes flexible portions 40 that are deflectable to permit one or more of the fingers 32 to shift radially inward and fit into the opening 25 of the wear ring 16. The fingers 32 include protrusions 44 that engage a groove 46 of the wall 17 of the wear ring 16 and resist axial movement of the insert 14 relative to the wear ring 16. The body 20 may be made of a resilient material and the resilient properties of the body 20 urge the protrusions 44 radially outward into the groove 46.

The fingers 32 form snap-fit connections 100 (see FIG. 3) with the groove 46 of the wear ring 16 which captures the insert 14 in the wear ring 16. In this manner, the insert 14 can be readily installed in the opening 25 of the wear ring 16 and, once positioned in the opening 25, the fingers 32 can separate the wear ring 16 from the journal 24 and reduce fretting wear between the wear ring 16 and journal 24.

Regarding FIGS. 1 and 2, the insert 14 may further include one or more flanges 47 extending outward from arcuate portions 48 of the body 20 that seat against the side 49 of the wear ring 16. The flanges 47 separate the wear ring 16 from the nearby bearing cone 50 and resist fretting wear between the wear ring 16 and the bearing cone 50. The flanges 47 have a rounded shape, such as a portion of a circle, and are spaced circumferentially about the body 20. The rounded shape of the flanges 47 and the use of multiple flanges around the body 20 make the insert 14 easier to mold. The flanges 47 may take different shapes, such as a single continuous annular flange. Further, the insert 14 may be provided without a flange such as in the insert 302 of FIG. 9.

Regarding FIG. 2, the insert 14 and wear ring 16 include respective central axes 30, 31 that are coaxial when the insert 14 has been assembled with the wear ring 16. The coaxial central axes 30, 31 are also coaxial with an axis 33 of rotation of the journal 24 as the journal 24 rotates. As used herein, the terms outer and inner with reference to a feature of the insert 14 or the wear ring 16 generally refer the radial position of the feature relative to the central axes 30, 31.

Regarding FIG. 1, the roller bearing 10 includes a bearing cup 60 that may be mounted to a frame of a railcar truck. The roller bearing 10 includes outer races 62 formed by the bearing cup 60 and inner races 64 formed by the bearing cones 50. A spacer ring 66 separates the bearing cones 50. Tapered rollers 68 are positioned between the inner and outer races 64, 62. The wear rings 16 with inserts 14 therein and bearing cones 50 are press-fit together onto the journal 24 and are tightly engaged therewith due to radial interference between the wear ring 16/insert 14 assemblies, the bearing cones 50, and the journal 24. As the journal 24 turns the wear rings 16 with inserts 14 therein, bearing cones 50, and spacer rings 66 turn with the journal 24. The tapered roller bearings 68 travel along the path defined between the inner and outer races 64, 62 with turning of the journal 24. The roller bearing 10 further includes seals 70 at opposite ends of the bearing cup 60 which resist egress of lubricant from within the roller bearing 10 as well as inhibit ingress of water, dirt, and debris into the roller bearing 10. The roller bearing 10 further includes a backing ring 80 having a curved surface 82 that engages a curved surface 84 of the journal 24. The roller bearing 10 further includes an end cap 86 that is secured via one or more fasteners such as bolts 88 to the journal 24. When the bolts 88 are tightened down, the end cap 86 clamps the wear rings 16, bearing cones 50, and spacer rings 66 between the end cap 86 and the backing ring 80.

Figure 3:
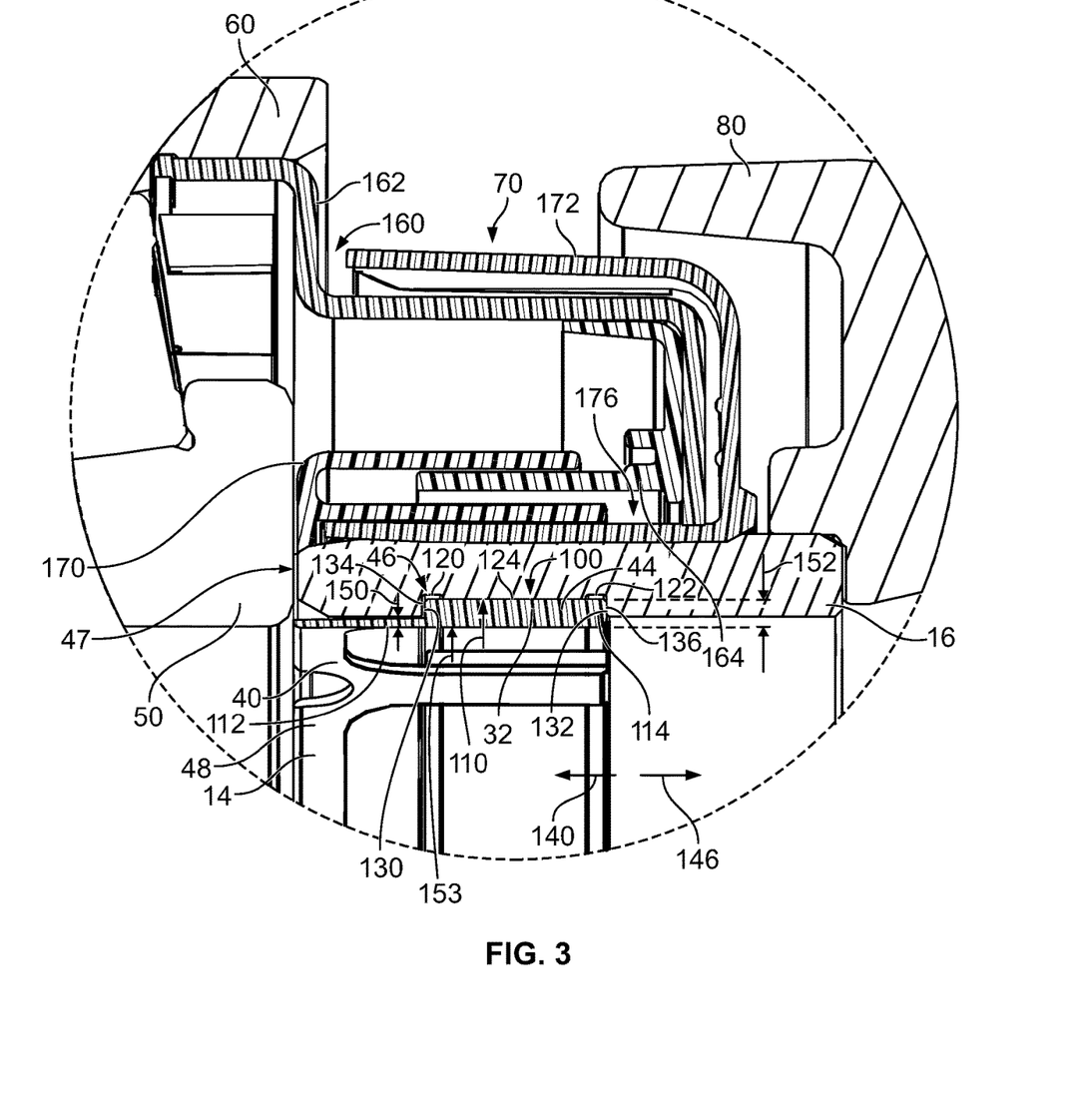
FIG. 3 is an enlarged view of the circled portion of FIG. 1 with the journal removed, FIG. 3 showing a protrusion of one of the fingers of the insert engaged with a channel of the wear ring.

With reference to FIG. 3, the fingers 32 of the insert 14 engage the groove 46 of the wear ring 16. The protrusions 44 of the fingers 32 have an outer diameter 110 that is nominally the same as an inner diameter of the groove 46 taken at a land 124 of the groove 46. For example, the outer diameter 110 of the protrusions 44 and the inner diameter of the groove 46 at the land 124 may each be approximately 6.4 inches. The journal 24 has an outer diameter that is larger than an inner diameter 153 of the fingers 32. When the wear ring 16 (with insert 14 therein) is press-fit onto the journal 24, the journal 24 forces the fingers 32 radially outward and tightly into the groove 46. The journal 24 thereby compresses the insert 14 between the journal 24 and the wear ring 16 and secures the journal 24, insert 14, and wear ring 16 together. The outward pressure provided by the compressed insert 14 holds the wear ring 16 outward from the journal 24 and keeps the wear ring 16 concentric with the journal 24. Concentricity between the wear ring 16 and the journal 24 avoids heat generation and sealing issues caused by an eccentric wear ring 16.

Regarding FIG. 3, the groove 46 includes channels 120, 122 and the land 124 separates the channels 120, 122. The channels 120, 122 provide relief areas for grinding during manufacture of the wear ring 16.

The protrusions 44 of the insert 14 and the groove 46 of the wear ring 16 have a mating profile that resists axial movement of the insert 14 relative to the wear ring 16. This resists the insert 14 from separating from the wear ring 16 as the wear ring 16 and insert 14 therein is press-fit onto the journal 24. In one embodiment, the protrusions 44 include stop surfaces 130, 132 that face stop surfaces 134, 136 of the groove 46. The abutting contact between the stop surfaces 130, 134 and 132, 136 resists axial movement of the insert 14 in direction 140 and direction 146.

The fingers 32 each include a base portion 112 and a free end portion 114. The insert 14 has a thickness that may vary throughout the body 20 and, in particular, throughout the fingers 32. For example, the arcuate portions 48 and the finger base portions 112 have a first thickness 150 that may be in the range of, for example, approximately 0.02 inches to approximately 0.05 inches, such as 0.03 inches. The protrusions 44 of the fingers 32 may have a larger second thickness 152. The larger second thickness 152 may be in the range of, for example, approximately 0.05 inches to approximately 0.1 inches, such as approximately 0.09 inches. The thinner first thickness 150 provides flexibility for the insert 14. The larger second thickness 152 provides material of the finger 32 to engage the groove 46.

Regarding FIG. 3, each seal 70 may include a seal case 160 that includes an outer seal 162 mounted to the bearing cup 60 and an insert 164 mounted to the outer seal 162. The seal case insert 164 may be press-fit into the outer seal 162. The seal 70 further includes a rotor 170 and a slinger 172 that is fixed to the rotor 170. The wear ring 16 is press-fit into a central opening of the slinger 162, which fixes the rotor 170 and the slinger 172 to the wear ring 16. Thus, the wear ring 16, rotor 170 and slinger 172 turn with rotation of the journal 124. The seal case insert 164, rotor 170, slinger 172, and outer seal 162 form a tortuous pathway 176 to limit egress of lubricant and ingress of water, dirt, and debris.

Figure 4:
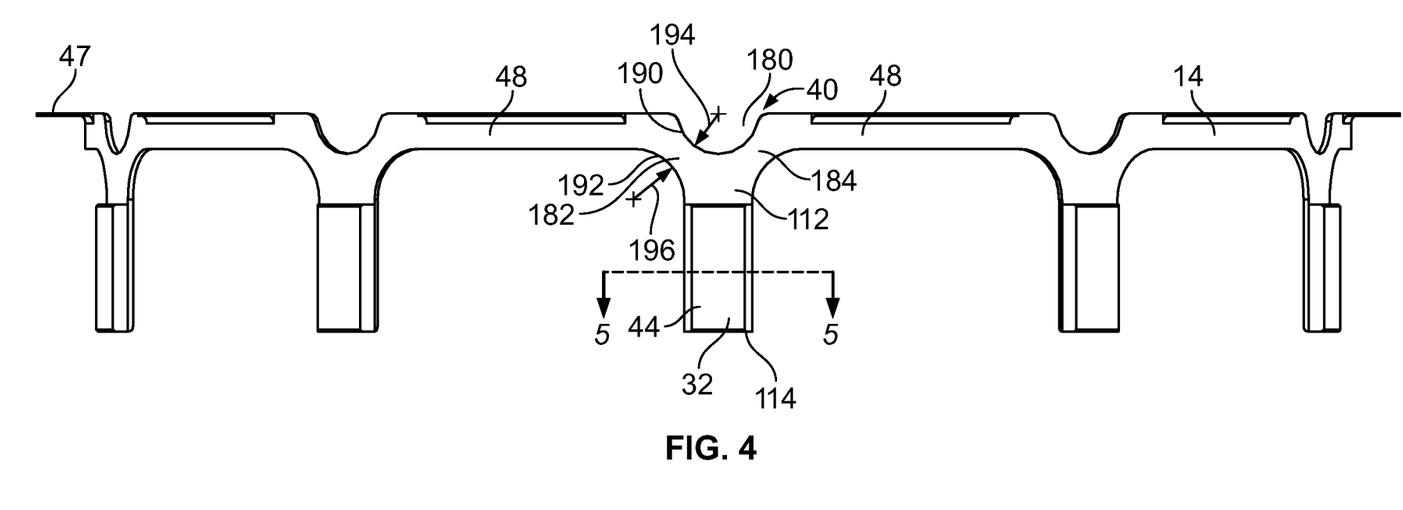
FIG. 4 is an elevational view of the insert of FIG. 3 showing each finger of the insert being connected to arcuate portions of the insert by a pair of spaced arm portions of the insert.

Regarding FIG. 4, the flexible portion 40 of the insert 14 includes a through opening, such as a notch 180, at the base portion 112 of each finger 32. The flexible portion 40 includes a pair of arm portions 182, 184 extending away from the base portion 112 on either side of the notch 180. The arm portions 182, 184 connect each finger 32 to two of the arcuate portions 48. The notch 180 reduces the amount of material of the insert 14 near the finger base portion 112 so that the insert 14 may more readily flex and permit the fingers 32 to deflect radially inward as the insert 14 is connected to the wear ring 16. In one embodiment, the arm portions 182, 184 have curved sides 190, 192 that have radii 194, 196. The curved sides 190, 192 limit stress concentrations in the material of the flexible portion 40. The arm portions 182, 184 have the same relatively thin second thickness 150 as the finger base portions 112 and the arcuate portions 48 to provide flexibility to the fingers 32.

Figure 5:
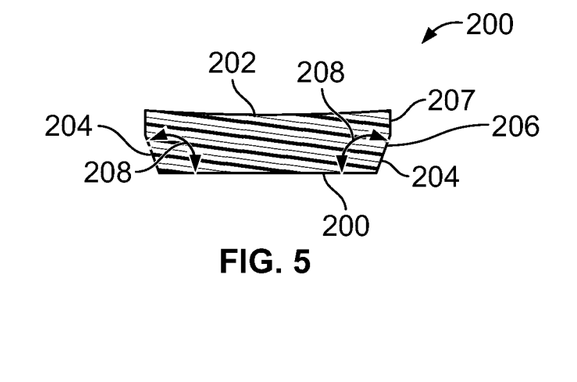
FIG. 5 is a cross-sectional view taken across line 5-5 in FIG. 4 showing a cross-section of one of the fingers of the insert.

Regarding FIGS. 4 and 5, the protrusions 44 resemble a block extending from the base portion 112. The protrusions 44 have a generally polygonal cross-section including an outer surface 200 that engages the land 124 (see FIG. 3), an inner surface 202 that engages the journal 24, and sides 204 connecting the outer and inner surfaces 200, 202. The sides 204 each include a tapered surface 206 and a radially extending surface 207. The tapered surfaces 206 extend at angles 208 relative to the inner surface 200. The sides 204 may operate as cam surfaces that assist in shifting of the fingers 32 radially inward as the fingers 32 are advanced in direction 210 (see FIG. 6) into the opening 25 of the wear ring 16. Further, the inner surfaces 202 are concave with a curvature that matches the outer surface of the journal 24.

Figure 6:
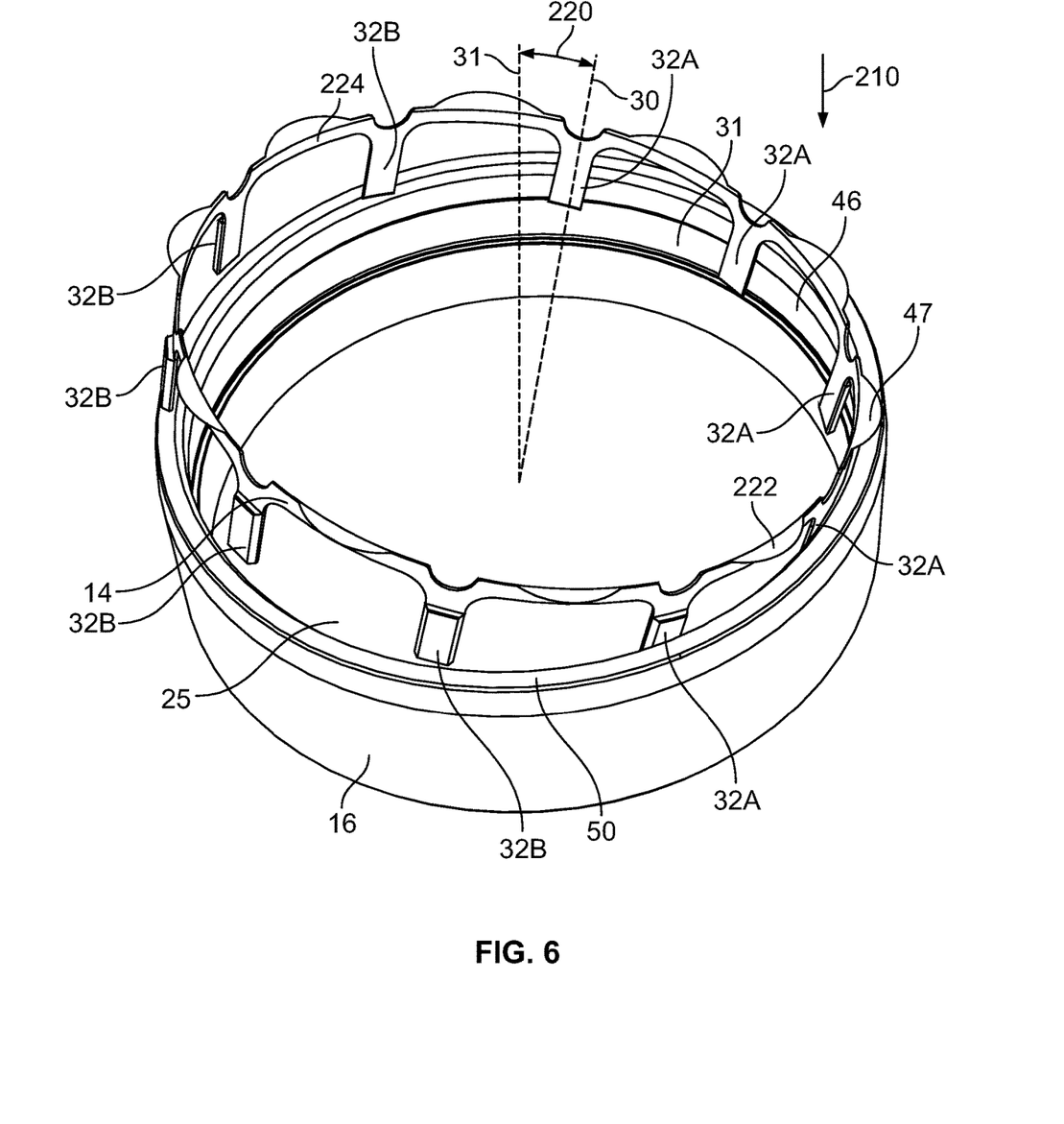
FIGS. 6, 7, and 8 show a method of assembling the insert and the wear ring of FIG. 2.
Figure 7:
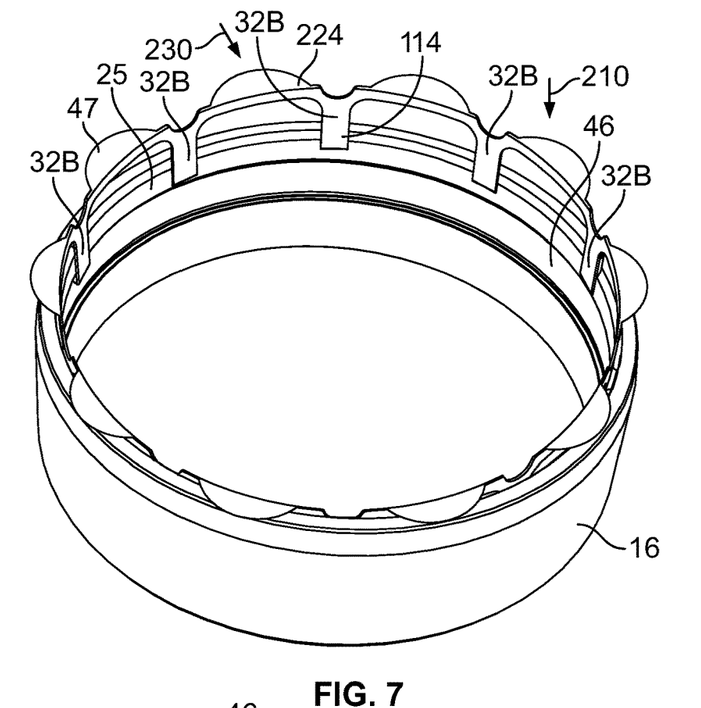
Figure 8:
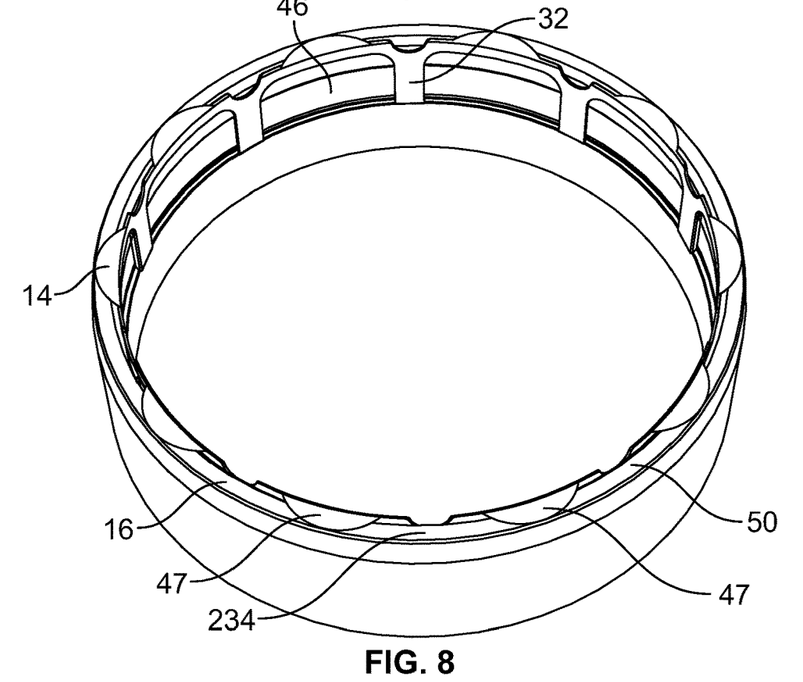

With reference to FIGS. 6-8, a method is provided for assembling the insert 14 and the wear ring 16. Initially, the insert 14 is positioned so that the center axis 30 of the insert 14 extends obliquely at an angle 220 relative to the center axis 31 of the wear ring 16. The method includes advancing at least one of the fingers 32 into the opening 25 of the wear ring 16. The advancing of the at least one of the fingers 32 may include advancing five fingers 32A into the opening 25 with one finger 32A being fully advanced into the opening 25 and four fingers 32A being partially advanced into the opening 25 as shown in FIG. 6. In one embodiment, the fingers 32A are advanced into the opening 25 by advancing a first side 222 of the insert 14 along axial direction 210 to advance the fingers 32A into the opening 25 at the angle 220. Because the fingers 32A are advanced into the opening 25 at the angle 220, the fingers 32A may not need to be deflected to fit into the opening 25.

Once the fingers 32A have been advanced into the opening 25, the remaining fingers 32B are proud of the opening 25 of the wear ring 16 as shown in FIG. 6. One or more of the remaining fingers 32B may also be radially outward from the opening 25.

With reference to FIG. 7, the wear ring 16 and insert 14 have been turned ninety degrees from the position shown in FIG. 6. The method includes urging the free end portions 114 of one or more of fingers 32B that were radially outside of the opening 25 radially inward in direction 230 so that the free end portions 114 of all of the fingers 32 are positioned within the opening 25 of the wear ring 16 as shown in FIG. 7. The urging of the free end portions 114 radially into the opening 25 involves deflecting the arm portions 182, 184 of the one or more fingers 32B that are radially outside of the opening 25. The arm portions 182, 184 flex to accommodate the inward movement of the free end portions 114.

Regarding FIG. 7, the insert 14 has a side 224 proud of the wear ring 16. To complete assembly of the insert 14 and the wear ring 16, the side 224 is advanced along axial direction 210 until all of the protrusions 44 of the fingers 32 engage the groove 46. Because the arm portions 182, 184 permit the radially inward movement of the fingers 32, the fingers 32 can be advanced into the opening 25 of the wear ring 16 with very little force in the axial directions 210 and radial direction 230. The insert 14 and the wear ring 16 may thereby be quickly assembled by hand without requiring a specialized press machine. It is noted that a machine may be used to automate the assembly process although the machine will apply relatively low forces to assemble the insert 14 and wear ring 16.

With reference to FIG. 8, the insert 14 has been fully advanced in the axial direction 210 such that all of the protrusions 44 of the fingers 32 have snapped into the groove 46 of the wear ring 16 and all of the flanges 47 have seated against the side 49 of the wear ring 16. As shown in FIG. 8, the flanges 47 are spaced apart from each other by gaps 234. The spaced flanges 47 may contact the bearing cone 50 and resist fretting wear between the wear ring 16 and the bearing cone 50. Further, the gaps 232 between the flanges 47 increase the flexibility of the insert 14.

In one embodiment, the insert 14 is made of a polymer. The wear ring may be made of metallic material such as steel. Because the insert 14 limits fretting wear between the wear ring 16 and the journal 24, the wear ring 16 does not itself have to be made of a material that will resist fretting wear with the journal 24. Thus, the insert 14 permits the wear ring 16 to be made of a green metal, i.e., a metal not subjected to a hardening process.

Figure 9:
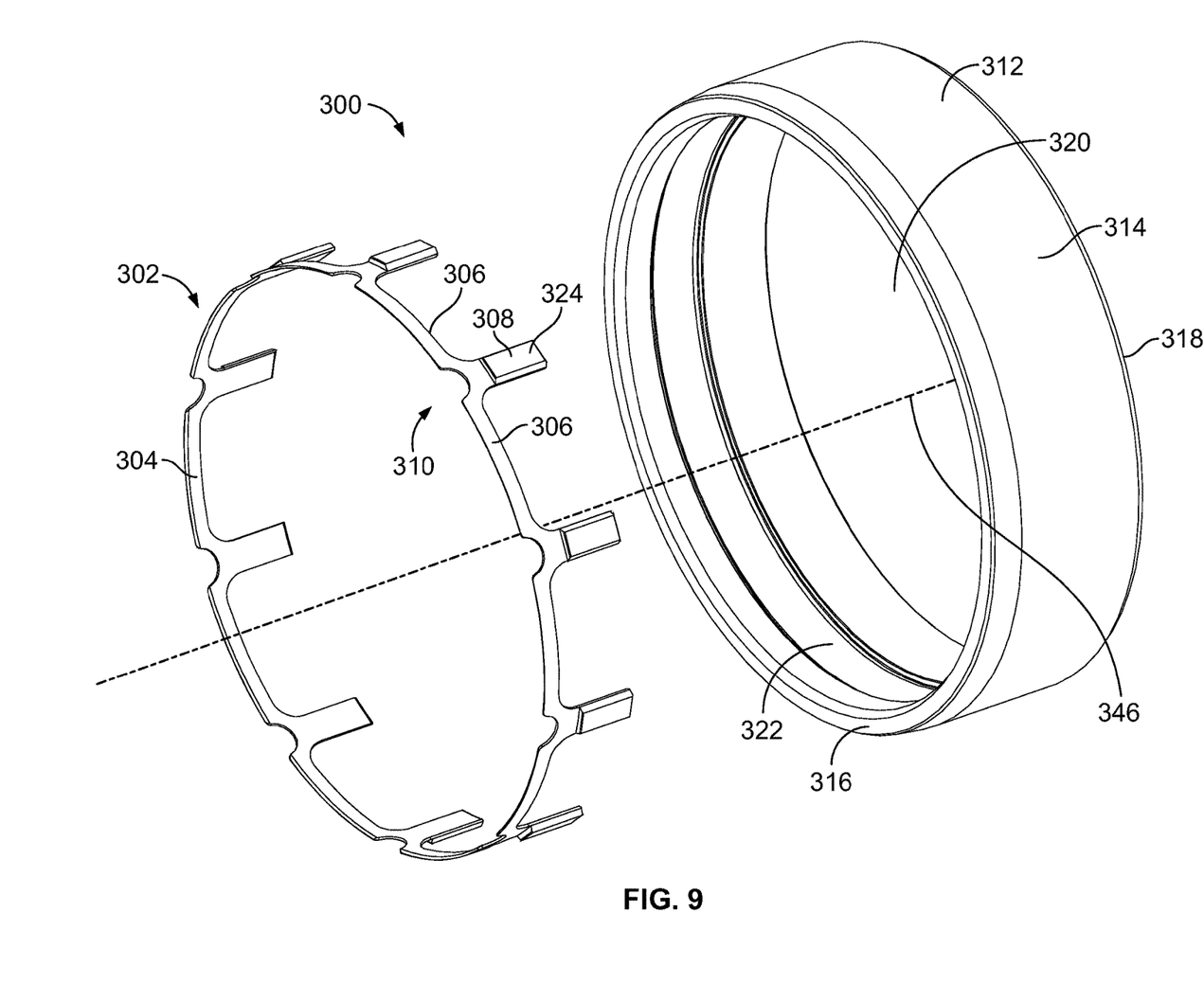
FIG. 9 is an exploded, perspective view of another insert and a wear ring.

With reference to FIG. 9, another wear ring assembly 300 is provided that is similar in many respects to the wear ring assembly 12 discussed above. The wear ring assembly 300 includes an insert 302 that is identical to the insert 14 discussed above with the exception that the insert 302 does not include flanges like the flanges 47 discussed above. The insert 302 includes an annular body 304 having arcuate portions 306, fingers 308, and flexible portions 310 connecting the fingers 308 to the arcuate portions 306.

The wear ring assembly 300 includes a wear ring 312 that is similar in many respects to the wear ring 16 discussed above. The wear ring 312 includes a wall 314 extending between a side 316 and a side 318 of the wear ring 312. The wall 314 extends about a central opening 320 and the wall 314 and includes a groove 322 that forms a snap-fit connection with protrusions 324 of the fingers 308. The wear ring 312 has a central axis 346 and each of the fingers 308 extend to an end 360 thereof.

Figure 10:
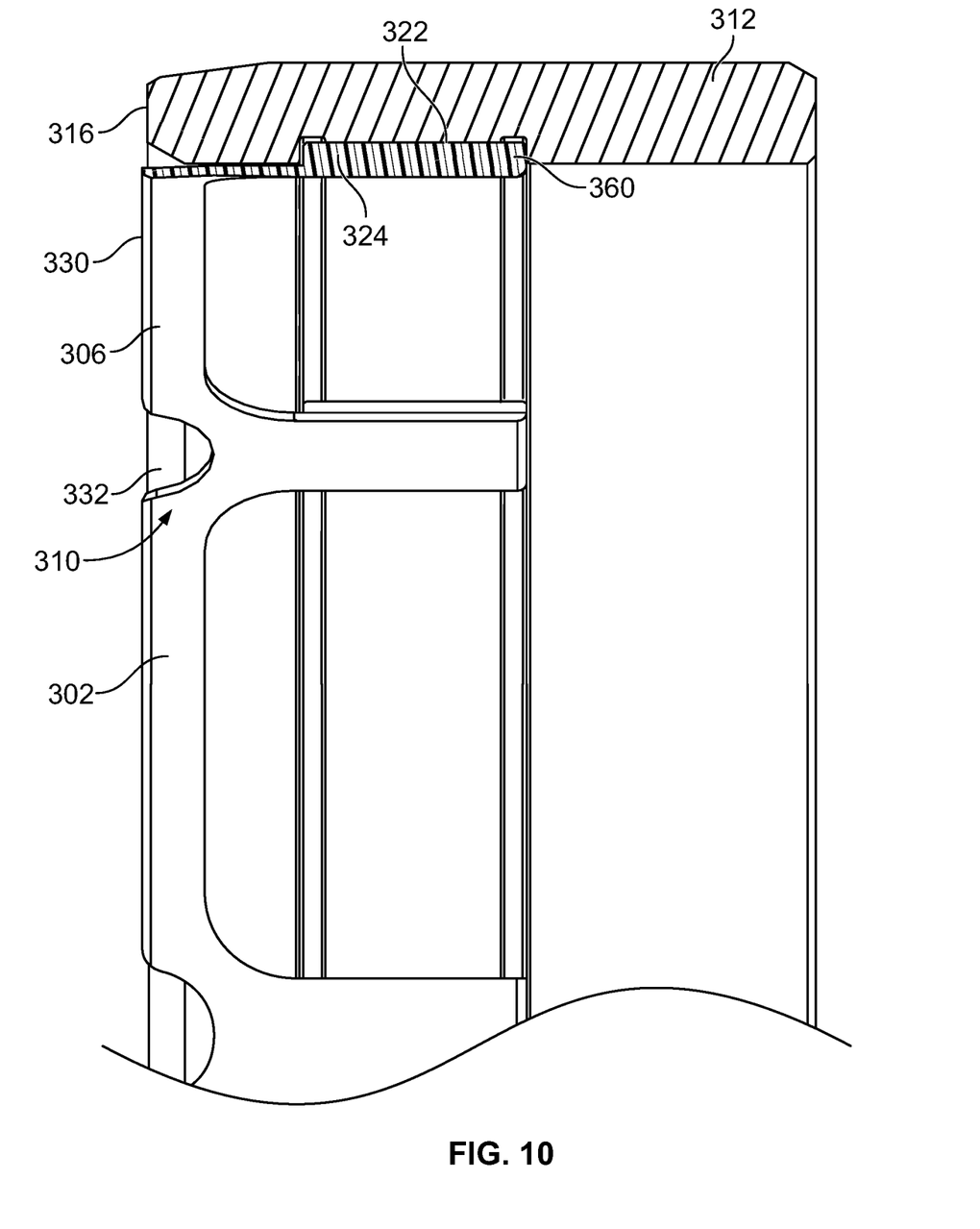
FIG. 10 is a cross-sectional view of the insert and wear ring of FIG. 9 showing a protrusion of a finger of the insert engaged with a groove of the wear ring.

With reference to FIGS. 9 and 10, the arcuate portions 306 include rim portions 330 of the insert 302. The rim portions 330 are separated by notches 332 of the flexible portions 310. One difference between the insert 302 and the insert 14 is that the insert 302 does not have flanges like the flanges 47. The side 316 of the wear ring 312 may therefore contact a bearing cone of the associated bearing assembly, which may be acceptable in some applications.

The roller bearing 10 discussed above may be a different type of roller bearing than the tapered roller bearing having two rows of bearings as shown in FIG. 1. For example, the roller bearing 10 may have a single row of tapered roller bearings, four rows of tapered roller bearings, cylindrical roller bearings, and/or ball bearings. Further, although operation of the roller bearing 10 typically involves the journal 24 rotating relative to the bearing cup 60, the bearing cup 60 may rotate about a stationary journal 24 or the bearing cup 60 and journal 24 may rotate at different speeds. The roller bearing 10 may be used with journals of railcars or with the journals of railway locomotives.

Figure 11:
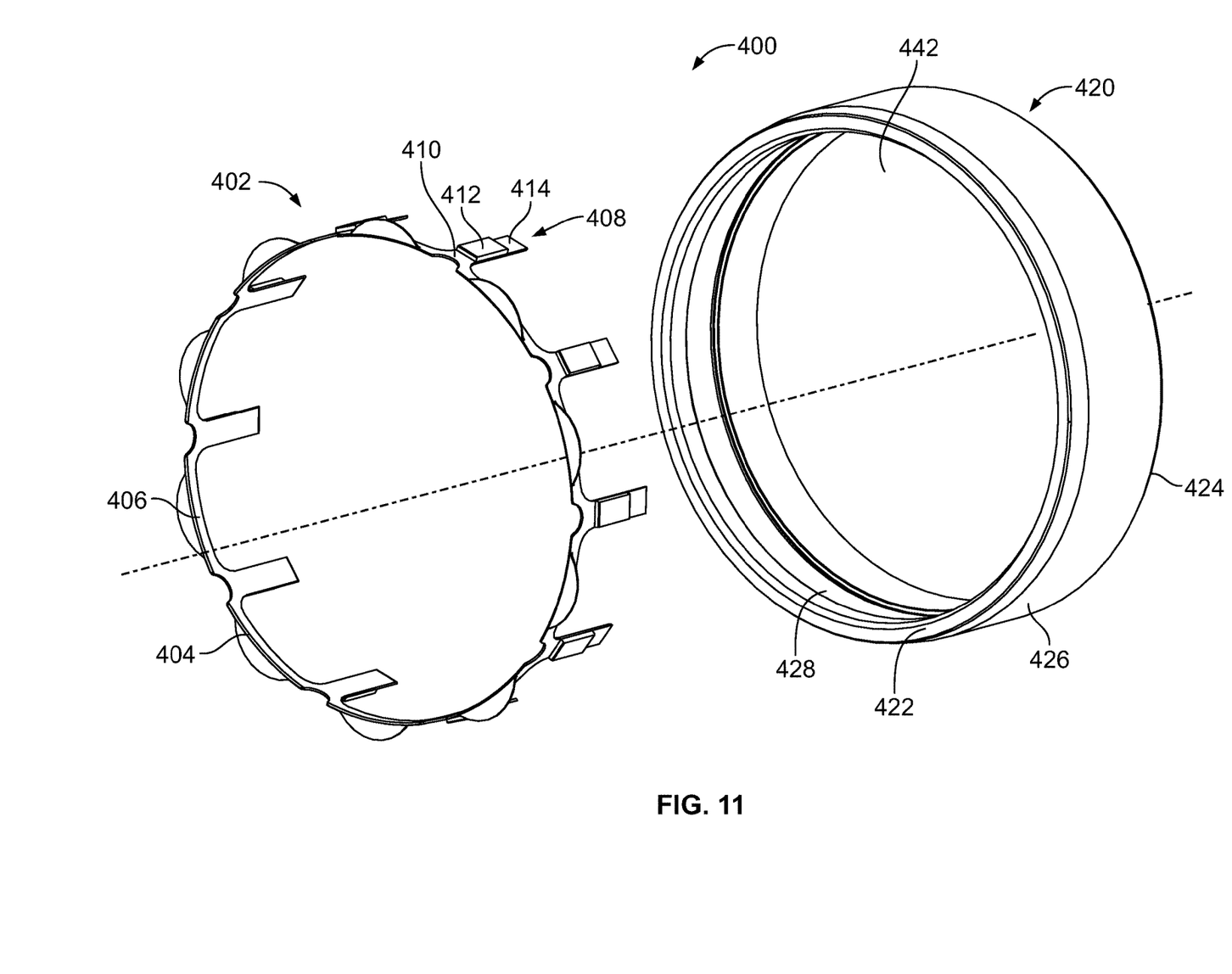
FIG. 11 is an exploded, perspective view of another insert and a wear ring.

With reference to FIG. 11, another wear ring assembly 400 is provided that is similar in many respects to the wear ring assemblies discussed above. The wear ring assembly 400 includes an insert 402 that is identical in many respects to the insert 14 discussed above. One difference between the inserts 14, 402 is that the insert 402 includes an annular body 404 having arcuate portions 406 and fingers 408. The fingers 408 each include a base portion 410, a protrusion 412, and a free end portion 414.

The wear ring assembly 400 includes a wear ring 420 having opposite sides 422, 424 and a wall 426 extending therebetween. The wall 426 includes a groove 428 that receives the protrusion 412 of each of the fingers 408 of the insert 402.

Figure 12:
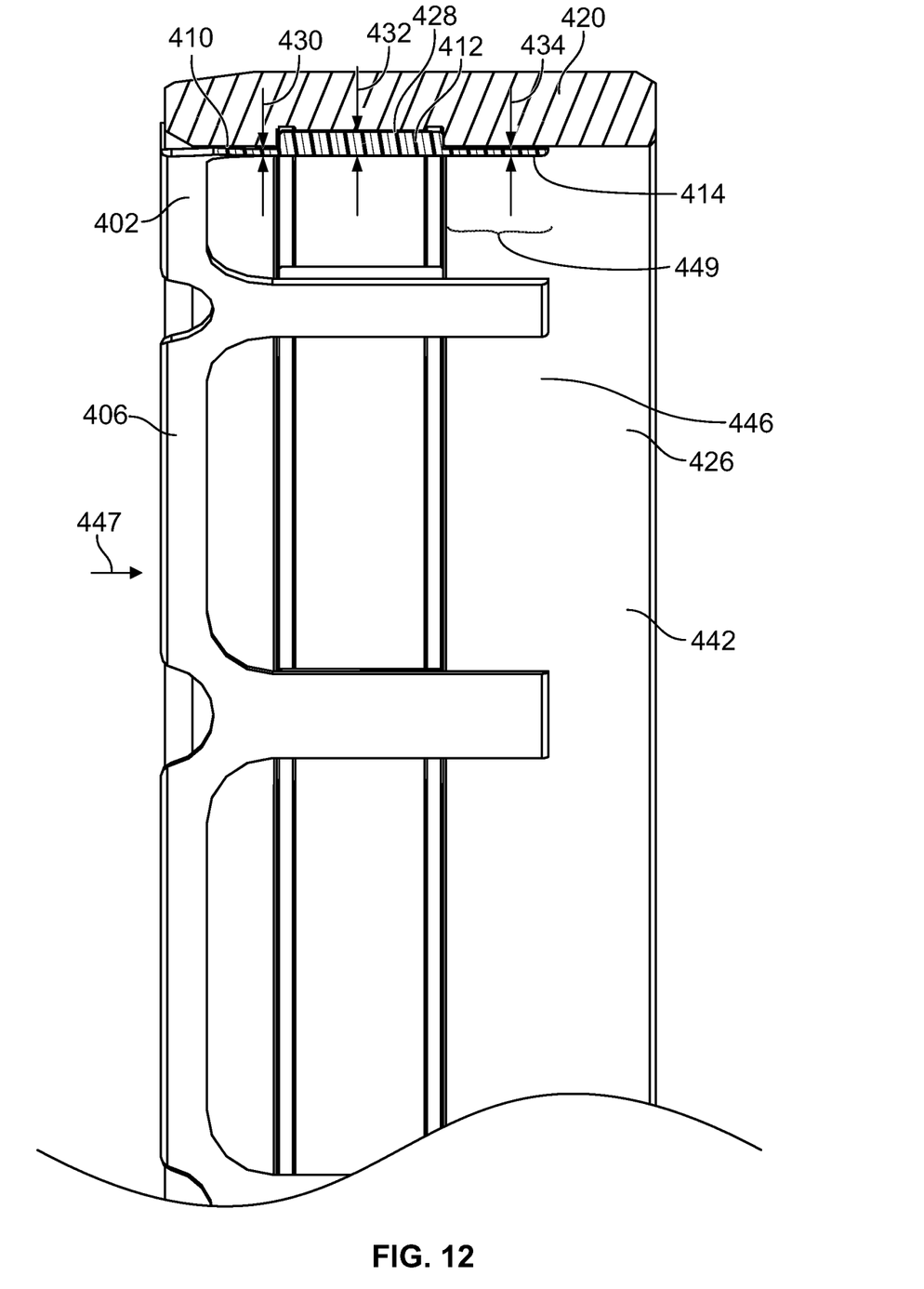
FIG. 12 is a cross-sectional view of the insert and wear ring of FIG. 11 showing a thin, free end portion of a finger of the insert extending along an inner surface of the wear ring.

With reference to FIG. 12, the base portion 410 has a thickness 430, the protrusion 412 has a thickness 432, and the free end portion 414 has a thickness 434 and a length 449. The thicknesses 430, 434 of the base portion 410 and free end portion 414 are less than the thickness 432 of the protrusion 412. In one embodiment, the thicknesses 430, 434 are identical. For example, the thicknesses 430, 434 may be approximately 0.03 inches and the thickness 432 may be approximately 0.09 inches.

With reference to FIG. 12, the free end portion 414 extends along an inner surface 446 of the wear ring wall 426 within a central opening 442 of the wear ring 420. In some applications, the free end portion 414 having the reduced thickness 434 may help the insert 402 stay within the wear ring 420 as a journal is advanced in direction 447 into the central opening 442 of the wear ring 420. The journal has a pilot portion with a slightly smaller outer diameter than a body portion of the journal. The smaller outer diameter of the pilot portion creates a gap between the outer diameter of the pilot portion and an inner diameter of the insert 402 as the pilot portion is advanced in direction 447 into the central opening 442. As the body portion of the journal enters the central opening 442, the body portion of the journal contacts the inner diameter of the arcuate portions 406 of the insert 402. The contact between the outer diameter of the journal body portion and the inner diameter of the insert arcuate portions 406 urges the fingers 408 to rock radially inward toward the journal pilot portion. However, the fingers 408 do not rock very far radially inward before contacting the pilot portion of the journal due to the length 449 of the free end portions 414. Because the fingers 408 do not rock very far radially inward, the protrusions 412 remain engaged with the groove 428 of the wear ring 420 and resist pull-through of the insert 402 from the wear ring 420 as the journal is advanced farther into the central opening 442.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. An insert for a wear ring of a railway roller bearing, the insert comprising:
   an annular body of a polymer material; and
   fingers of the annular body spaced apart from each other about the annular body, the annular body permitting at least one of the fingers to be deflected radially inward as the fingers are inserted into the wear ring.

2. The insert of claim 1 wherein the annular body includes arcuate portions and flexible portions connecting the fingers to the arcuate portions, the flexible portions being deflectable to permit the at least one of the fingers to shift radially inward as the fingers are inserted into the wear ring.

3. The insert of claim 2 wherein the flexible portions each include a pair of flexible arm portions connecting one of the fingers to two of the arcuate portions of the annular body.

4. The insert of claim 1 wherein the fingers include protrusions configured to engage a groove of the wear ring.

5. The insert of claim 1 wherein the annular body has a central axis, the fingers extend parallel to the central axis, and the fingers each include a thickness measured perpendicular to the central axis that varies along the finger.

6. The insert of claim 5 wherein each finger includes a base portion and a free end portion opposite the base portion, and wherein each finger includes a first thickness at the base portion and a second thickness intermediate the base portion and the free end portion that is greater than the first thickness.

7. The insert of claim 1 wherein the annular body includes a plurality of flanges spaced apart from each other about the annular body.

8. The insert of claim 1 wherein the annular body has a unitary, one-piece construction.

9. The insert of claim 1 wherein the annular body is resilient.

10. A wear ring assembly for a railway roller bearing, the wear ring assembly comprising:
   a wear ring having a central opening for receiving a journal of a railway wheel assembly; and
   an insert including a plurality of spacers configured to extend in the opening of the wear ring to separate the wear ring from the journal, the spacers being separated from each other around the wear ring
   wherein the wear ring includes a pair of opposite sides and the central opening extends between the opposite sides; and
   the insert includes at least one flange extending along one of the sides of the wear ring to separate the wear ring from another component of the railway roller bearing.

11. The wear ring assembly of claim 10 wherein the wear ring includes a groove and the spacers are each engaged with the groove of the wear ring.

12. The wear ring assembly of claim 10 wherein the insert is annular and includes arcuate portions connecting the spacers.

13. The wear ring assembly of claim 10 wherein insert has a unitary, one-piece construction.

14. The wear ring assembly of claim 13 wherein the insert is made of a polymer.

15. The wear ring assembly of claim 10 wherein the wear ring has not been subjected to a hardening process.

16. The wear ring assembly of claim 10 wherein the one side of the wear ring includes a radially extending surface; and
   wherein the at least one flange extends radially to overlap the radially extending surface of the one side of the wear ring and separate the wear ring from the other component of the railway roller bearing.

17. A method of assembling a wear ring and an insert having a plurality of spacers, the method including:
   advancing at least one of the spacers of the insert into an opening of the wear ring; and
   advancing the remainder of the spacers of the insert into the opening of the wear ring to position the spacers around the opening of the wear ring.

18. The method of claim 17 wherein advancing the at least one of the spacers of the insert into the opening of the wear ring includes advancing the at least one of the spacers into the opening at an angle relative to a central axis of the wear ring.

19. The method of claim 17 wherein advancing the remainder of the spacers of the insert into the opening includes inwardly deflecting at least one of the remainder of the spacers.

20. The method of claim 17 wherein advancing the remainder of the spacers into the opening of the wear ring includes flexing at least one flexible portion of the insert associated with at least one of the remainder of the spacers.

21. The method of claim 17 wherein advancing the remainder of the spacers of the insert into the opening of the wear ring includes shifting a free end of at least one of the remainder of the spacers from a first position radially outward from the opening of the wear ring to a second position radially inward from the first position.

22. The method of claim 17 wherein advancing the remainder of the spacers into the opening of the wear ring includes bending a pair of flexible arm portions of the insert to shift one of the remainder of spacers radially inward.

23. The method of claim 17 further comprising engaging projections of the spacers with a groove of the wear ring.

24. The method of claim 17 further comprising seating at least one flange of the insert against a side of the wear ring.

25. A wear ring assembly for a railway roller bearing, the wear ring assembly comprising:
   a wear ring having an opening for receiving a journal of a railway wheel assembly;
   an insert including a plurality of fingers spaced apart from each other about the insert, the fingers configured to extend in the opening of the wear ring to separate wear ring from the journal; and
   the insert permitting at least one of the fingers to shift relative to the other fingers to facilitate assembly of the insert with the wear ring.

26. The wear ring assembly of claim 25 wherein the insert includes an annular portion; and
   wherein the fingers include free end portions and base portions, the base portions connecting the free end portions of the fingers to the annular portion.

27. The wear ring assembly of claim 25 wherein the wear ring includes a groove; and
   wherein the fingers of the insert include protrusions to engage the groove and retain the insert in the wear ring.

28. The wear ring assembly of claim 25 wherein the insert has a central axis, the fingers extend parallel to the central axis, and the fingers each include a thickness measured perpendicular to the central axis that varies along the finger;
   wherein each finger includes a base portion and a free end portion opposite the base portion; and
   wherein each finger includes a first thickness at the base portion and a second thickness intermediate the base portion and the free end portion that is greater than the first thickness.

29. The wear ring assembly of claim 25 wherein the insert has a unitary, one-piece construction and includes a polymer material.

30. The wear ring assembly of claim 25 wherein the wear ring and the insert include surfaces configured to engage and shift the at least one of the fingers relative to the other fingers with advancing of the at least one of the fingers into the opening of the wear ring.

31. The wear ring assembly of claim 25 wherein the insert includes a plurality of through openings at the fingers.

32. The wear ring assembly of claim 25 wherein the insert includes at least one flange to separate the wear ring from another component of the railway roller bearing.

33. A wear ring assembly for a railway roller bearing, the wear ring assembly comprising:
   a wear ring having a central opening to receive a journal of a railway wheel assembly, the wear ring having a pair of opposite sides and the central opening extends between the opposite sides; and
   an annular insert to be received in the central opening of the wear ring and separate the wear ring from the journal;
   wherein the annular insert includes at least one flange to extend along one of the sides of the wear ring and separate the wear ring from another component of the railway roller bearing.

34. The wear ring assembly of claim 33 wherein the one side of the wear ring includes a radially extending surface; and wherein the at least one flange extends radially to overlap the radially extending surface of the one side of the wear ring and separate the wear ring from the other component of the railway roller bearing.

35. The wear ring assembly of claim 33 wherein the one side of the wear ring includes a radially extending surface;

wherein the wear ring includes an inner surface and a tapered surface connecting the radially extending surface and the inner surface; and wherein the at least one flange overlaps the radially extending surface of the one side of the wear ring to separate the wear ring from the other component of the railway roller bearing.

36. The wear ring assembly of claim 33 wherein the wear ring includes an inner groove that opens to the central opening; and wherein the annular insert includes at least one outward projection to engage the inner groove of the wear ring.

37. The wear ring assembly of claim 33 wherein the annular insert has a unitary, one-piece construction and comprises a polymer material.

38. The wear ring assembly of claim 33 wherein the wear ring has not been subjected to a hardening process.

39. The wear ring assembly of claim 33 in combination with the other component of the railway roller bearing;

wherein the other component of the railway roller bearing includes a bearing cone.

40. The wear ring assembly of claim 33 wherein the annular insert includes a plurality of spacers separated from each other around the annular insert, the spacers configured to separate the wear ring from the journal.

41. A wear ring assembly for a railway roller bearing, the wear ring assembly comprising:

a wear ring having a central opening for receiving a journal of a railway wheel assembly; and an insert including a plurality of spacers configured to extend in the opening of the wear ring to separate the wear ring from the journal, the spacers being separated from each other around the wear ring;

wherein the wear ring has a central axis and a predetermined length along the central axis; and the spacers of the insert extend along the wear ring for at least half of the length of the wear ring.

42. A wear ring assembly for a railway roller bearing, the wear ring assembly comprising:

a wear ring having a central opening for receiving a journal of a railway wheel assembly; and an insert including a plurality of spacers configured to extend in the opening of the wear ring to separate the wear ring from the journal, the spacers being separated from each other around the wear ring;

wherein the insert is annular and includes arcuate portions connecting the spacers;

wherein the wear ring includes pairs of flexible arm portions, each pair of flexible arm portion connecting one of the spacers to two of the arcuate portions.

* * * * *